US012595978B2

(12) United States Patent
Army et al.

(10) Patent No.: US 12,595,978 B2
(45) Date of Patent: Apr. 7, 2026

(54) DRAIN SYSTEM FOR ECS WATER COLLECTION

(71) Applicant: Hamilton Sundstrand Corporation, Charlotte, NC (US)

(72) Inventors: Donald E. Army, Enfield, CT (US); Frederick Peacos, III, North Scituate, RI (US); Louis J. Bruno, Ellington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 195 days.

(21) Appl. No.: 18/446,067

(22) Filed: Aug. 8, 2023

(65) Prior Publication Data

US 2025/0052525 A1     Feb. 13, 2025

(51) Int. Cl.
*F28F 17/00* (2006.01)
*B64D 13/06* (2006.01)

(52) U.S. Cl.
CPC ............ *F28F 17/005* (2013.01); *B64D 13/06* (2013.01); *B64D 2013/0674* (2013.01); *F25B 2339/047* (2013.01)

(58) Field of Classification Search
CPC .............................................. B64D 2013/0662
See application file for complete search history.

(56) References Cited

U.S. PATENT DOCUMENTS

| | | | |
|---|---|---|---|
| 4,829,775 A | * | 5/1989 | Defrancesco ............. F24F 3/04 62/402 |
| 7,591,869 B2 | | 9/2009 | Jensen et al. |
| 10,408,492 B2 | | 9/2019 | Simpson et al. |
| 10,639,574 B2 | | 5/2020 | Zager et al. |
| 2001/0004837 A1 | | 6/2001 | Sauterleute |
| 2010/0323601 A1 | | 12/2010 | Cremers et al. |
| 2013/0160472 A1 | | 6/2013 | Klimpel et al. |

FOREIGN PATENT DOCUMENTS

RU          2637080 C1    11/2017

OTHER PUBLICATIONS

Search Report issued in European Patent Application No. 24193724. 2; Date of Mailing Jan. 10, 2025 (8 pages).

* cited by examiner

*Primary Examiner* — Ana M Vazquez
(74) *Attorney, Agent, or Firm* — CANTOR COLBURN LLP

(57) ABSTRACT

An environmental control system includes a first water collector having a first drain line and a second water collector having a second drain line. The first drain line is fluidly connected to the second drain line. The environmental control system includes also includes at least one spray nozzle. An outlet of the second drain line is fluidly connected to the at least one spray nozzle.

11 Claims, 7 Drawing Sheets

DRAIN SYSTEM FOR ECS WATER COLLECTION

BACKGROUND

Embodiments of the present disclosure relate to environmental control systems for a vehicle, and more particularly, to a water collector suitable for use in an environmental control system of an aircraft.

A water collector or water extractor may be provided within an environmental control system to capture or remove free moisture from an airflow. The water collector may include a separation device that directs the moisture present within the airflow to outer walls of the separation device and direct the free moisture towards a drain port. Often times the water collector may be substantially bulky and consume large amounts of space. Further, in environmental control systems having multiple water collectors, each water collector is fluidly coupled to a different component of outlet.

BRIEF DESCRIPTION

According to an embodiment, an environmental control system includes a first water collector having a first drain line and a second water collector having a second drain line. The first drain line is fluidly connected to the second drain line. The environmental control system includes also includes at least one spray nozzle. An outlet of the second drain line is fluidly connected to the at least one spray nozzle.

In addition to one or more of the features described above, or as an alternative, in further embodiments a pressure at the first water collector is greater than a pressure at the second water collector.

In addition to one or more of the features described above, or as an alternative, in further embodiments a pressure at the second water collector is greater than a pressure of at least one spray nozzle.

In addition to one or more of the features described above, or as an alternative, in further embodiments a turbine is configured to receive a flow of medium and output a flow of expanded medium. The first water collector is located upstream from the turbine relative to the flow of medium and the second water collector is located downstream from the turbine relative to the flow of expanded medium.

In addition to one or more of the features described above, or as an alternative, in further embodiments an outlet of the first drain line is fluidly coupled to a conduit extending between an outlet of the turbine and an inlet of the second water collector.

In addition to one or more of the features described above, or as an alternative, in further embodiments an outlet of the first drain line is fluidly coupled to an inlet of the second water collector.

In addition to one or more of the features described above, or as an alternative, in further embodiments an outlet of the first drain line is directly connected to the second drain line.

In addition to one or more of the features described above, or as an alternative, in further embodiments the second water collector has a main body portion and a settling chamber and an outlet of the first drain line is connected to the settling chamber.

In addition to one or more of the features described above, or as an alternative, in further embodiments the second water collector has a main body portion and a settling chamber and an outlet of the first drain line is connected to the main body portion.

In addition to one or more of the features described above, or as an alternative, in further embodiments the main body portion includes a guide operable to substantially separate a flow of water provided via the first drain line from a medium flowing through the second water collector.

In addition to one or more of the features described above, or as an alternative, in further embodiments the at least one spray nozzle is a single spray nozzle.

In addition to one or more of the features described above, or as an alternative, in further embodiments the environmental control system includes at least one regeneration heat exchanger, the at least one spray nozzle being oriented to direct a flow onto a surface of the at least one regeneration heat exchanger.

According to an embodiment, a method of operating an environmental control system includes removing water from a medium at a first water collector, the first water collector having a first drain, removing water from the medium at a second water collector, the second water collector being arranged downstream from the first water collector relative to a flow of medium, and mixing the water from the first drain with the water removed from the medium at the second water collector at or downstream from the second water collector.

In addition to one or more of the features described above, or as an alternative, in further embodiments mixing the water from the first drain with the water removed from the medium at the second water collector at or downstream from the second water collector includes providing the water from the first drain directly to a drain line extending from the second water collector.

In addition to one or more of the features described above, or as an alternative, in further embodiments mixing the water from the first drain with the water at or downstream from the second water collector includes providing the water from the first drain directly to a settling chamber of the second water collector.

In addition to one or more of the features described above, or as an alternative, in further embodiments mixing the water from the first drain with the water at or downstream from the second water collector includes providing the water from the first drain to a main body portion of the second water collector.

In addition to one or more of the features described above, or as an alternative, in further embodiments mixing the water from the first drain with the water at or downstream from the second water collector includes providing the water from the first drain to an inlet of the main body portion of the second water collector. The inlet is configured to receive the flow of medium.

In addition to one or more of the features described above, or as an alternative, in further embodiments the water from the first drain is mixed with the flow of medium upstream from the inlet.

In addition to one or more of the features described above, or as an alternative, further embodiments include delivering a mixture of the water from the first water collector and the water from the second water collector to at least one spray nozzle.

In addition to one or more of the features described above, or as an alternative, further embodiments include spraying the mixture of the water from the first water collector and the water from the second water collector at a surface of a heat exchanger.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
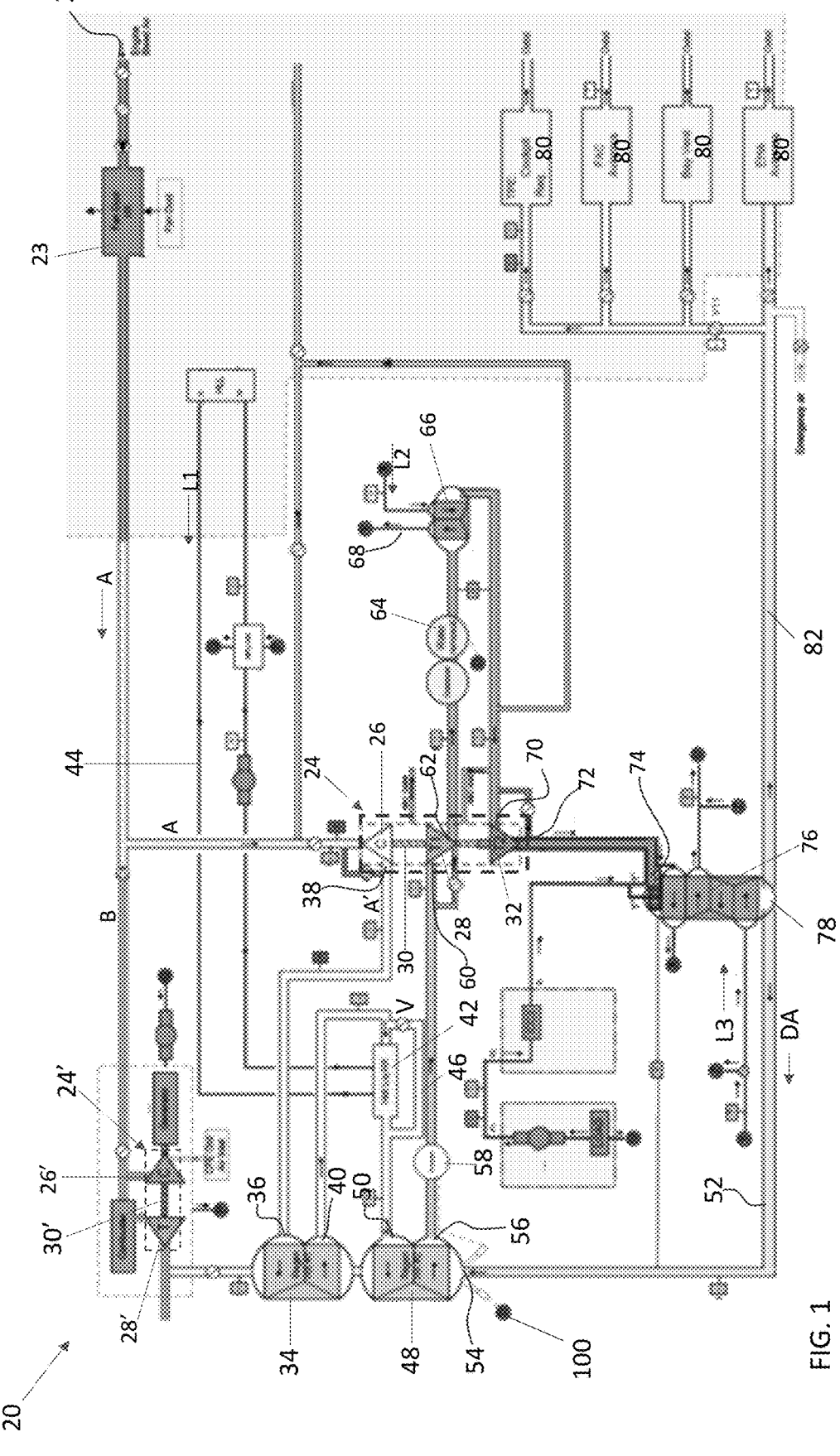
FIG. 1 is a schematic diagram of a portion of an environmental control system of an aircraft.

With reference now to FIG. 1, a schematic diagram of a portion of an existing environmental control system (ECS), such as an air conditioning unit or pack for example, is depicted according to non-limiting embodiments as illustrated. Although the environmental control system 20 is described with reference to an aircraft, alternative applications, such as another vehicle for example, are also within the scope of the disclosure. As shown in the figure, the ECS 20 can receive a medium A at an inlet 22. In an embodiment where the environmental control system 20 is used in an aircraft application, the medium A may be bleed air, which is pressurized air originating from, i.e., being "bled" from, an engine or auxiliary power unit of the aircraft. It shall be understood that one or more of the temperature, humidity, and pressure of the bleed air can vary based upon the compressor stage and revolutions per minute of the engine or auxiliary power unit from which the air is drawn.

In another embodiment, the medium A provided to the inlet 22 is fresh air, such as outside air for example. The outside air can be procured via one or more scooping mechanisms, such as an impact scoop or a flush scoop for example. In an embodiment, the medium A is ram air drawn from a portion of a ram air circuit. Generally, the fresh or outside air as described herein is at an ambient pressure equal to an air pressure outside of the aircraft when the aircraft is on the ground and is between an ambient pressure and a cabin pressure when the aircraft is in flight.

The ECS 20 additionally includes at least one compressing device 24. The compressing device 24 is a mechanical device that includes components for performing thermodynamic work on a medium (e.g., extracts work from or applies work to the medium A by raising and/or lowering pressure and by raising and/or lowering temperature). Examples of a compressing device 24 include an air cycle machine, a two-wheel air cycle machine, a three-wheel air cycle machine, a four-wheel air cycle machine, etc. As shown, the compressing device 24, also referred to herein as an air cycle machine, may include a compressor 26 and at least one turbine 28 operably coupled by a shaft 30. In an embodiment, the compressing device 24 includes two turbines 28, 32. In such embodiments, the medium A may be configured to flow through the turbines 28, 32 in series, or alternatively, in parallel.

A compressor 26 is a mechanical device configured to raise a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. A turbine, such as any of turbines 28 and 32 for example, is a mechanical device that expands a medium and extracts work therefrom (also referred to as extracting energy) to drive the compressor 26 via the shaft 30.

As shown, the medium A provided at the inlet 22 may be cooled within a heat exchanger 23 before being delivered to the compressing device 24. The heat sink for the heat exchanger 23 used to cool the medium A may be ram air, engine fan air, or fuel. In the illustrated, non-limiting embodiment, the cooled medium A is provided to an inlet of the compressor 26. The act of compressing the medium A heats and increases the pressure of the medium A.

An inlet 36 of a first regeneration heat exchanger 34 is fluidly connected to the outlet 38 of the compressor 26. The compressed medium A' output from the compressor outlet 38 may be further cooled within the first heat exchanger 34. In the illustrated, non-limiting embodiment, the secondary fluid used to cool the compressed medium A' within the first regeneration heat exchanger 34 is a flow provided from an outlet of another compressing device 24'. As shown, the flow of medium A at a location downstream from the heat exchanger 23 may be split into a first portion A provided to the compressor 26 of the compressing device 24 and a second portion B provided to a second compressing device 24'. Some of the second portion B may be provided to a turbine 28' of the second compressing device 24'. Within the turbine 28', energy is extracted from the second portion B of the medium and used to drive the compressor 26' via a shaft 30', thereby reducing both the pressure and the temperature of the second portion B of the medium. However, embodiments where another secondary fluid is used to cool the compressed medium A' within the first regeneration heat exchanger 34 are also within the scope of the disclosure.

In some embodiments, a first air-liquid heat exchanger 42 is located downstream from the outlet 40 of the first regeneration heat exchanger 34. Within the first air-liquid heat exchanger 42, thermal energy is transferred between the compressed medium A' and a liquid L1 provided from a liquid loop 44 used to condition, for example cool, one or more loads of the vehicle. In an embodiment, heat is transferred from the compressed medium A' to the liquid L of the first liquid loop 44 at the first air-liquid heat exchanger 42. However, a bypass conduit 46 having a valve V may be arranged in parallel with the first air-liquid heat exchanger 42 such that the compressed medium A' output from the outlet 40 of the first regeneration heat exchanger 42 may bypass the first air-liquid heat exchanger 42.

Located downstream from the first air-liquid heat exchanger 42 and from the bypass conduit 46 is a second regeneration heat exchanger 48. Accordingly, a flow of compressed medium A' output from at least one of the first air-liquid heat exchanger 42 and the bypass conduit 46 is provided to an inlet 50 of the second regeneration heat exchanger 42. In an embodiment, the second regeneration heat exchanger 48 may be an air-air heat exchanger configured to utilize excess cooling capacity of the ECS 20 to further cool the compressed medium A'. For example, as will be described in more detail below, part of a conditioned form of the medium ready to be delivered to one or more loads of the vehicle, such as the cockpit for example, may be diverted along a regeneration pathway 52 to a second inlet 54 of the second regeneration heat exchanger 50. At the second regeneration heat exchanger 50, the compressed medium A' is cooled via thermal exchange with this diverted medium DA. The heated diverted medium DA may then be exhausted overboard or provided to another component of subsystem of the aircraft.

The further cooled compressed medium A' output from the outlet 56 of the second regeneration heat exchanger 50 may have water removed therefrom, such as via a water collector or scupper 58 for example, before being provided to an inlet 60 of the turbine 28. It should be appreciated that at the water collector 58, the compressed medium A' is at its highest pressure within the ECS 20, and therefore, the water collector 58 may be considered a high-pressure water collector.

Within the turbine 28, energy is extracted from the compressed medium A' to form an expanded medium A''. The work extracted from the compressed medium A' in the turbine 28 drives the compressor 26. The pressure downstream of the first turbine 28 is at a middle pressure, a pressure lower than upstream from the first turbine 28 but higher than the pressure of the medium A at the air cycle machine outlet (outlet of turbine 32). In an embodiment, the expanded medium A'' is provided to a middle-pressure water collector 64 configured to remove moisture therefrom. The middle-pressure water collector 64 is configured to coalesce the fog within the expanded medium A'' and remove free moisture from the flow of the expanded medium A''. The temperature of the expanded medium A'' output from an outlet 62 the turbine 28 may be above freezing to facilitate the water removal. In an embodiment, the temperature of the expanded medium A'' at and downstream from the outlet 62 of the turbine 28 is maintained above freezing when the aircraft is at lower altitudes where water may be present.

In the illustrated, non-limiting embodiment, the expanded medium A'' output from the turbine 28 is provided to another heat exchanger, such as a second air-liquid heat exchanger 66. At the second air-liquid heat exchanger 66, the expanded medium A'' is arranged in a heat transfer relationship with another liquid L2 provided from another liquid loop 68, such as used to cool one or more loads of the vehicle. Although the liquid loop 68 is illustrated and described herein as being distinct from the liquid loop 44 associated with the first air-liquid heat exchanger 42, it should be understood that the same liquid from the same liquid loop may be used to heat the medium A at both heat exchangers 42, 66. In such embodiments, the second air-liquid heat exchanger 66 is arranged downstream from the first air-liquid heat exchanger 42 relative to both the flow of the medium A and the flow of the liquid.

Regardless of the source of the liquid, within the second air-liquid heat exchanger 66, thermal energy is transferred between the expanded medium A'' and the liquid L2. In an embodiment, the expanded medium A'' is heated by the liquid L2 and the resulting cooler liquid L2 may then directed to one or more heat loads of the liquid loop 68.

Because heat is transferred from the compressed medium A' to the liquid L of the first liquid loop 44 at the first air-liquid heat exchanger 42, and heat is transferred from the liquid L2 of the second liquid loop 68 to the expanded medium A'' at the second air-liquid heat exchanger 42, the first liquid loop 44 may be considered a hot or heating liquid loop and the second liquid loop 68 may be considered a cold or cooling liquid loop.

From the second air-liquid heat exchanger 66, the expanded medium A'' may be provided to an inlet 70 of the second turbine 32. The energy extracted from the expanded medium A'' within the second turbine 32 is also used to drive the compressor 26. The resulting expanded medium A'' output from an outlet 72 of the second turbine 32 is cooler and has a lower pressure than the expanded medium A'' provided at the inlet thereof.

From the second turbine 32, the expanded medium A'' is provided to an inlet 74 of a third heat exchanger. In an embodiment, the third heat exchanger is a third air-liquid heat exchanger 76 where the expanded medium A'' is thermally coupled to a liquid L3. However, embodiments where the third heat exchanger is an air-air heat exchanger are also within the scope of the disclosure. The liquid L3 provided as the secondary fluid at the third air-liquid heat exchanger 76 may be the same liquid used in at least one of the first and second air-liquid heat exchangers 42, 66. In an embodiment, the third air-liquid heat exchanger 76 is arranged downstream from the second air-liquid heat exchanger relative to the flow of both the medium A and the liquid L2 of liquid loop 68. However, embodiments where the liquid L3 provided to the third air-liquid heat exchanger 76 is different than that provided to both the first air-liquid heat exchanger 42 and the second air-liquid heat exchanger 66 are also contemplated herein.

Within the third air-liquid heat exchanger 76, thermal energy is transferred between the expanded medium A'' and the liquid L3. In an embodiment, the expanded medium A'' is heated by the liquid L3, and the resulting cooler liquid L3 is then directed to one or more liquid cooled heat loads. The expanded medium A'' at the outlet 78 of the third air-liquid heat exchanger 76 may be controlled between 0° F. and 35° F. depending on the altitude of the aircraft. The conditioned, expanded medium A'' leaving the third air-liquid heat exchanger 76 may be provided to one or more loads, illustrated schematically at 80 via a conduit 82. These loads include but are not limited to three potential destinations: the cockpit, the forced air-cooled equipment, or a bay vent. In some embodiments, at least a portion of the conditioned, expanded medium A'' at the outlet 78 of the third air-liquid heat exchanger 76 is provided to the second regeneration heat exchanger 48 via a regeneration pathway 52 (as the diverted air DA) previously described herein. It should be understood that the environmental control system 20 illustrated and described herein is intended as an example only, and that an ECS having another suitable flow configuration for conditioning one or more mediums is within the scope of the disclosure.

In existing ECS systems, each of the various water collectors are fluidly independent from one another and are connected to distinct components or systems. However, in the illustrated, non-limiting embodiment, two or more water collectors within the ECS 20, such as the high-pressure water collector 58 and the mid-pressure water collector 64 for example, are fluidly connected to one another such that the water collected in the high-pressure water collector is mixed with the water collected at the mid-pressure water collector. In such a configuration, the plurality of fluidly coupled water collectors are configured to deliver mixture of the water from the high-pressure water collector and the mid-pressure water collector to the same system, such as to one or more spray nozzles 100 associated with a heat exchanger of the ECS 20 for example. In an embodiment, the at least one spray nozzle 100 is a single spray nozzle oriented such that an outlet of the spray nozzle is configured to spray water at a cold surface of at least one regeneration heat exchanger 34, 48 to achieve additional evaporative cooling.

Figure 2:
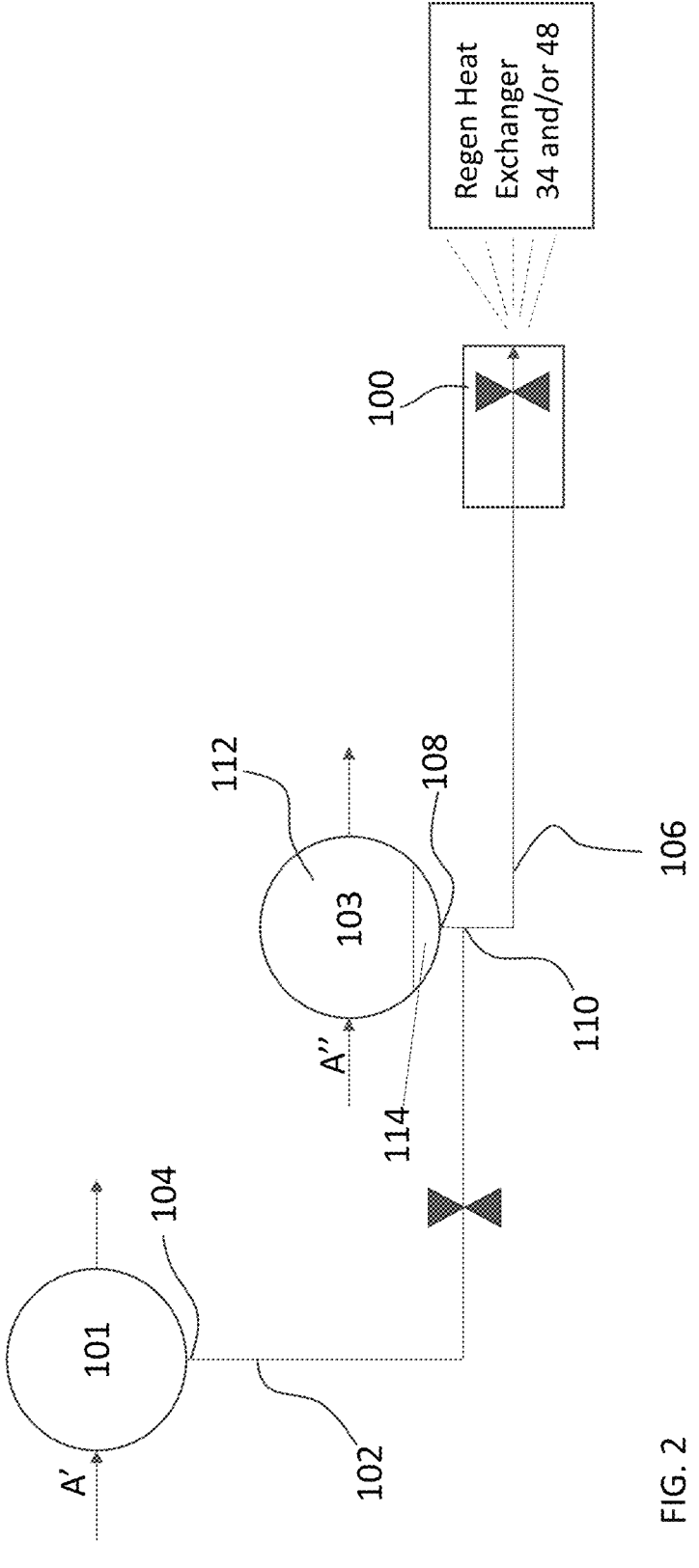
FIG. 2 is a schematic diagram of a plurality of water collectors of an environmental control system of an aircraft according to an embodiment.
Figure 3:
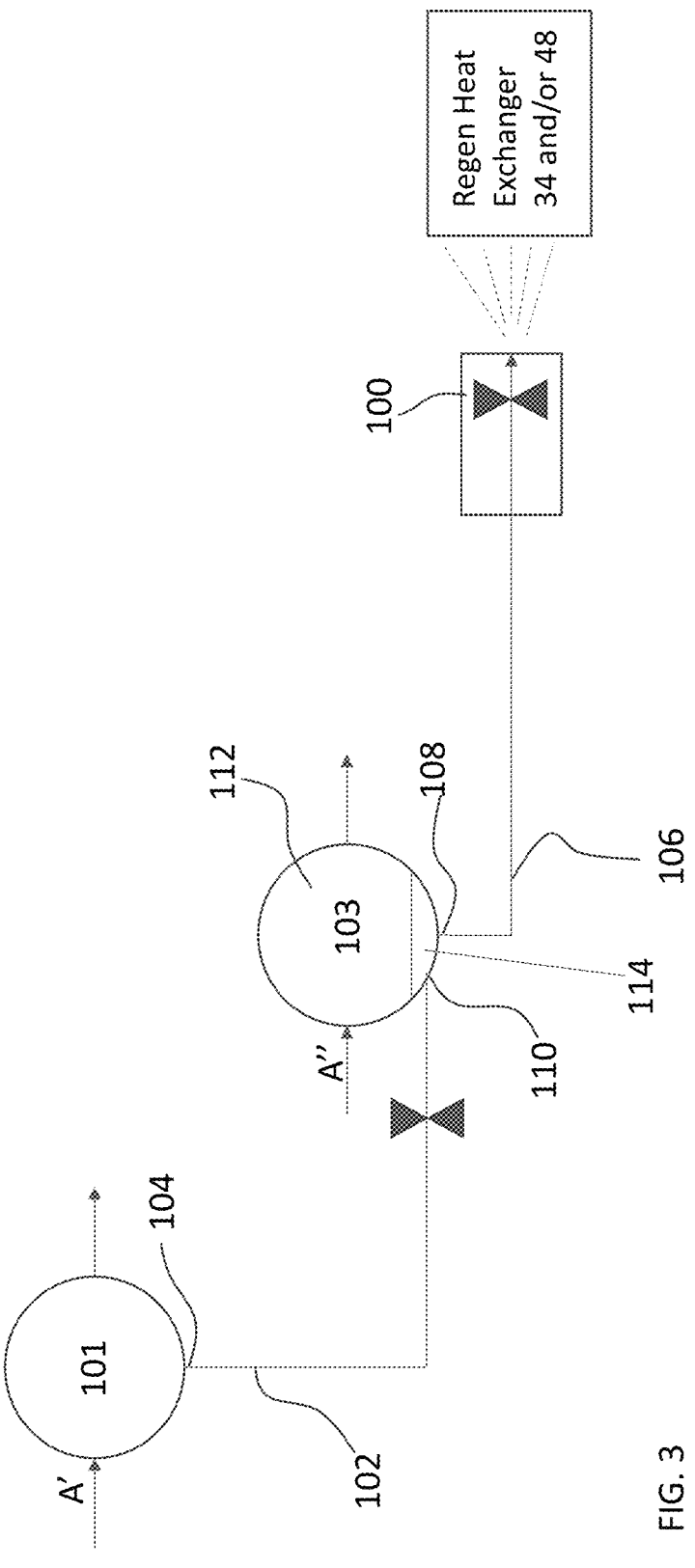
FIG. 3 is a schematic diagram of a plurality of water collectors of an environmental control system of an aircraft according to another embodiment.
Figure 4:
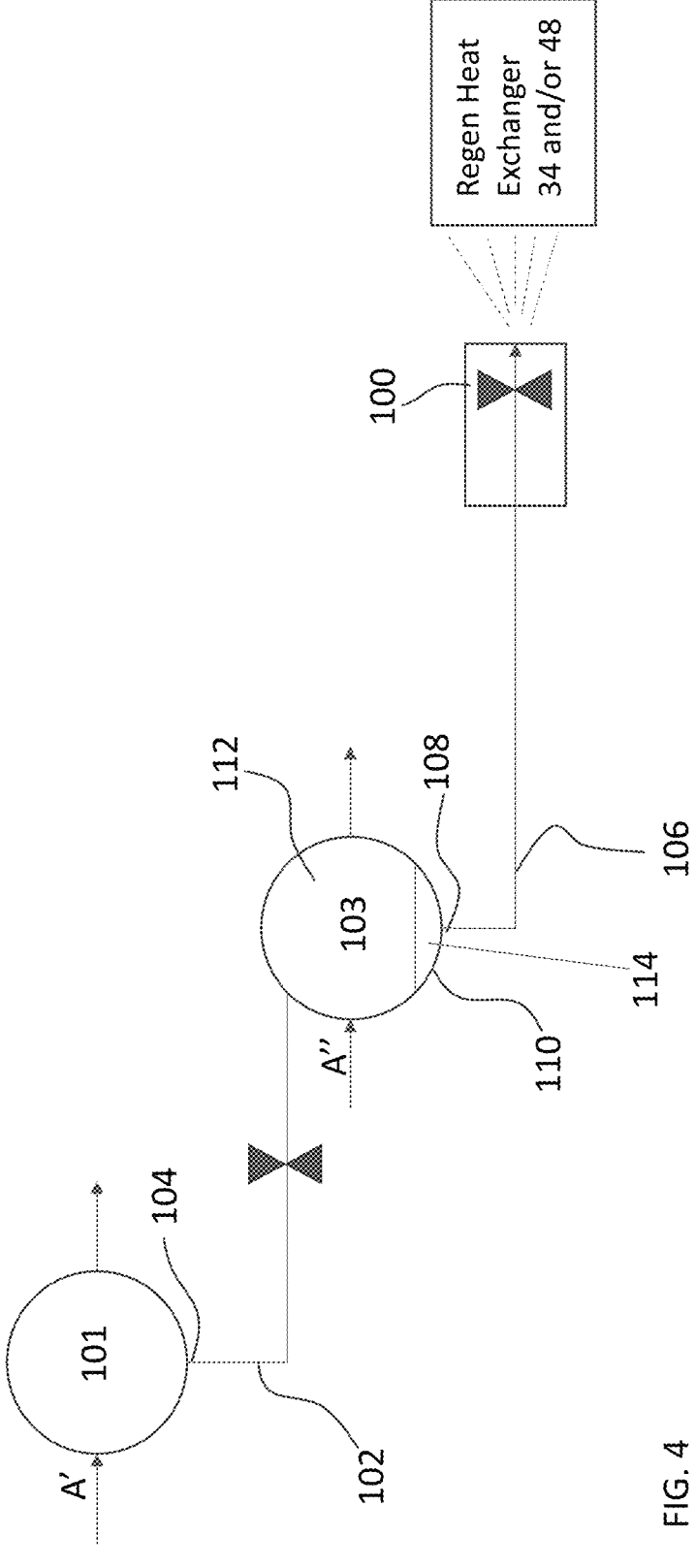
FIG. 4 is a schematic diagram of a plurality of water collectors of an environmental control system of an aircraft according to an embodiment.

With reference now to FIGS. 2-4, an exemplary drain system of an environmental control system, such as ECS 20 for example, is illustrated. As shown, a first drain conduit 102 extends from and is fluidly connected to a drain 104 of a first water collector 101 and a second drain conduit 106 extends from and is fluidly coupled to a drain 108 of a second water collector 103. In an embodiment, the high-pressure water collector 58 is configured as the first water collector 101 and the mid-pressure water collector 64 is configured as the second water collector 103. It should be appreciated that embodiments where the mid-pressure water collector 64 is the first water collector 101 and the high-pressure water collector 58 is the second water collector 103 are also within the scope of the disclosure. Further, in embodiments where the ECS 20 includes additional water collector or scuppers, the high-pressure water collector 58 and/or the mid-pressure water collector 64 need not be one of the plurality of fluidly coupled water collectors 101, 103.

The plurality of water collectors 101, 103 may be fluidly coupled such that the pressure reduces in the direction of flow of the water. Accordingly, the pressure at the first water collector 101 may be greater than the pressure at the second water collector 103. Further, the pressure at the second water collector may be greater than the pressure of the at least one spray nozzle 100. This reduction is pressure provides the motive force for delivering the water to the spray nozzle 100.

In the illustrated, non-limiting embodiment of FIG. 2, an outlet 110 of the first drain conduit 102 is directly connected to the second drain conduit 106 at a location downstream from the drain 108 of the second water collector 103. In such an embodiment, the water from both the first water collector 101 and the second water collector 103 mixes at a location downstream from both the first water collector 101 and the second water collector 103. In other embodiments, the outlet 110 of the first drain conduit 102 may be connected to a portion of the second water collector 103. For example, the second water collector 103 may include a main body portion 112 and a settling chamber 114 located generally adjacent, such as vertically underneath the main body portion 112. In some embodiments, the flow of expanded medium A" provided to the mid-pressure water collector 64 or another suitable second water collector 103 is configured to flow through the main body portion 112, but not through the settling chamber 114. As the flow passes through the main body portion 112, water within the expanded medium A" may collect on one or more coalescing elements within the main body portion 112 and fall via gravity into the settling chamber 114. However, it should be appreciated that the mid-pressure water collector 64 described herein is intended as an example only and that a water collector having any suitable configuration is within the scope of the disclosure.

Figure 5:
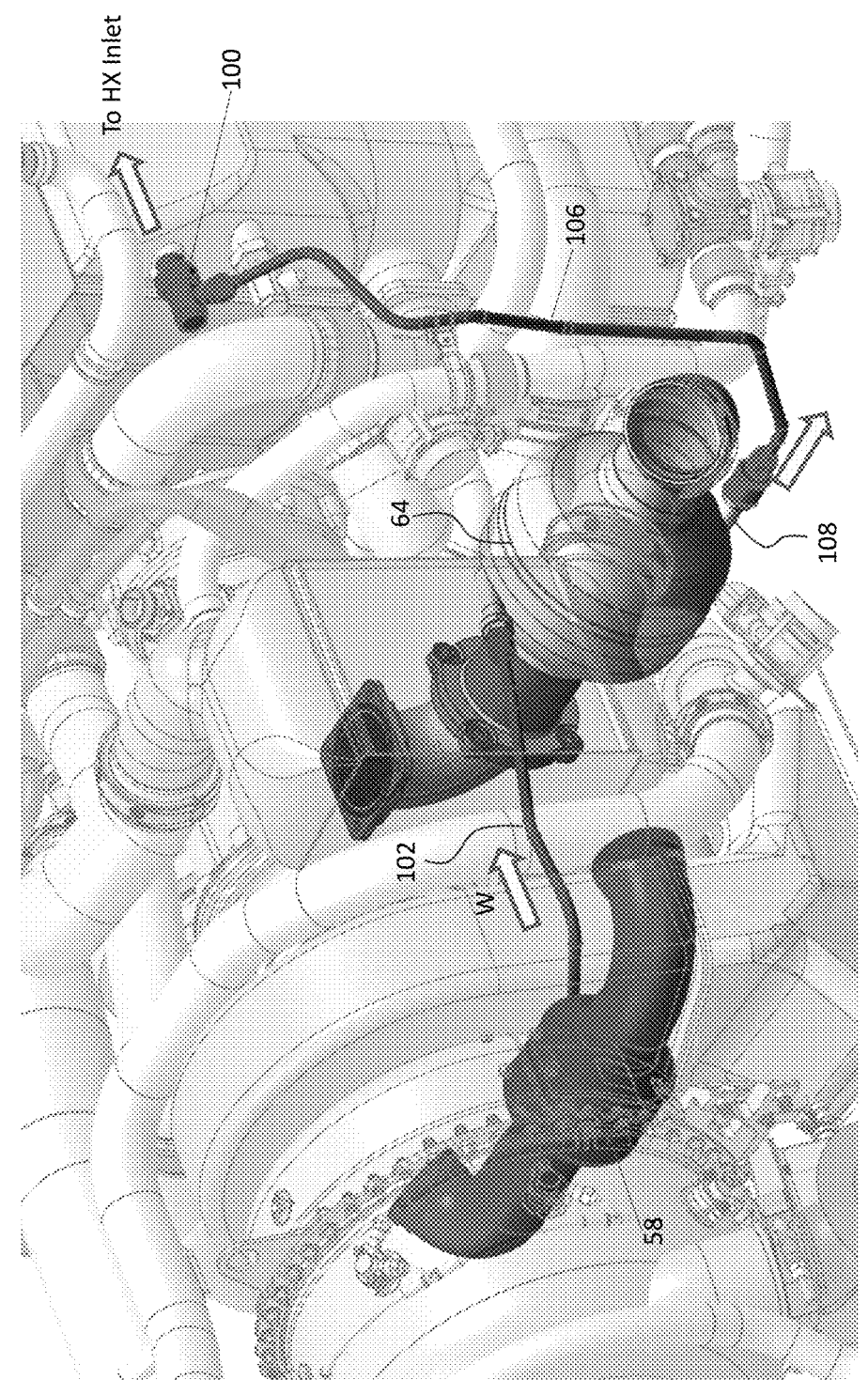
FIG. 5 is a perspective view of a portion of an environmental control system including the plurality of water collectors of FIG. 4 according to an embodiment.
Figure 6:
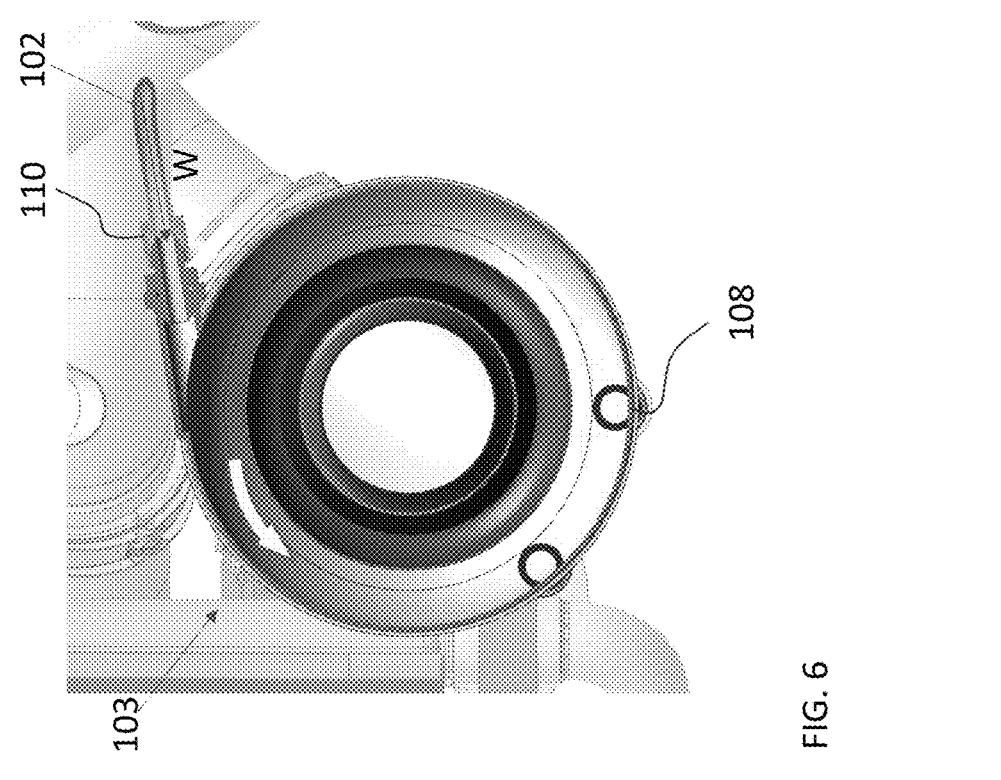
FIG. 6 is a sectional view of a downstream water collector of an environmental control system according to an embodiment.

With reference now to FIG. 3, in an embodiment, the first drain conduit 102 is coupled to this settling chamber 114 such that water drained from the first water collector 101 is provided directly to the settling chamber 114 of the second water collector 103 via the first drain conduit 102. Alternatively, or in addition the first drain conduit 102 may extend between and fluidly couple the drain 104 of the first water collector 101 to the main body portion 112 or to a portion of the second water collector 103 through which the flow of medium A passes (see FIGS. 4 & 5). In such embodiments, the water from the outlet 110 of the first drain conduit 102 may be coupled to an inlet such that the water W is configured to mix with the medium A flowing through main body portion 112 of the second water collector 103, as shown in FIG. 6.

Figure 7:
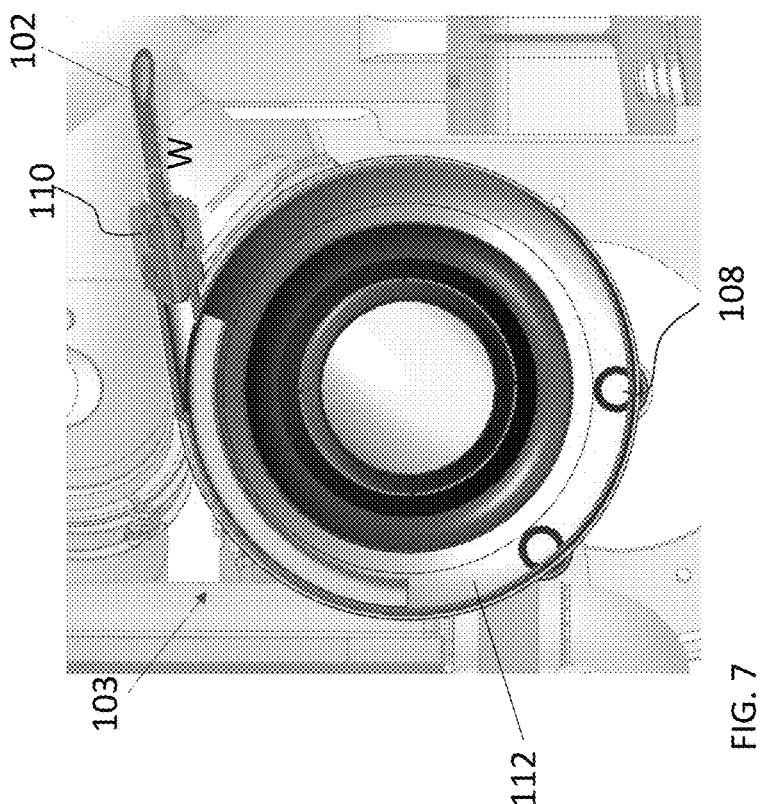
FIG. 7 is a sectional view of a downstream water collector of an environmental control system according to another embodiment.

In other embodiments, as shown in FIG. 7, a guide may be arranged within an interior of the main body portion 112 of the second water collector 103. The guide may be operable to substantially separate the water W from the medium A flowing through the second water collector 103 about at least a portion of a periphery of the main body portion 112. For example, the guide may extend from a water inlet about at least 60° of the periphery of the main body portion 112 to a lower portion of the main body portion 112 of the second water collector 103, and in some embodiments about at least 75° or at least 90° of the main body portion 112 to a lower portion of the main body portion 112. By maintaining the flow of water W separate from the air A within the upper portion of the main body portion 112, the amount of water W that will become entrained within the flow of air A is reduced.

Figure 8:
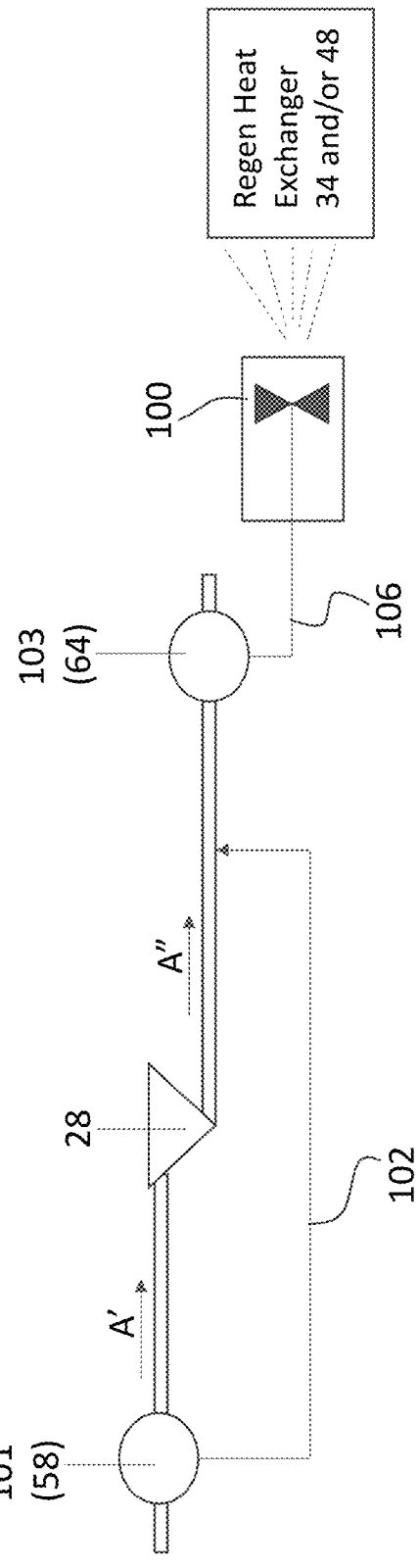
FIG. 8 is a schematic diagram of a plurality of water collectors of an environmental control system of an aircraft according to an embodiment.

With reference to FIG. 8, in an embodiment, the first drain conduit 102 extending from a first water collector 101, such as the high-pressure water collector 58 for example, may be connected to or upstream from the inlet of the second water collector 103, such as the mid-pressure water collector 64. In such embodiments, the water from drain line 102 is rejoined with the flow of expanded medium A" at any location between the outlet of the turbine 28 and the inlet of mid-pressure water collector 64. In an embodiment, the first drain conduit 102 may be oriented tangentially to a cross-section section of the corresponding duct to enhance the swirl of the water as it mixes with the expanded medium A" and enters the mid-pressure water collector 64.

An ECS 20 having fluidly coupled water collectors as described herein eliminates the need for dedicated drain lines and/or as dedicated spray nozzles for each of the water collectors. Such a configuration additionally reduces the length of the drain lines of the water system, and therefore the need for corresponding structural supports, such as clamps, washers, bolts etc.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system comprising:
   a first water collector having a first drain line;
   a second water collector having a second drain line, wherein the first drain line is fluidly connected to the second drain line;
   at least one spray nozzle, an outlet of the second drain line being fluidly connected to the at least one spray nozzle; and
   at least one regeneration heat exchanger, the at least one spray nozzle being oriented to direct a flow onto a surface of the at least one regeneration heat exchanger.

2. The environmental control system of claim 1, wherein a pressure at the first water collector is greater than a pressure at the second water collector.

3. The environmental control system of claim 1, wherein a pressure at the second water collector is greater than a pressure of the at least one spray nozzle.

4. The environmental control system of claim 1, further comprising a turbine configured to receive a flow of medium and output a flow of expanded medium, wherein the first water collector is located upstream from the turbine relative to the flow of medium and the second water collector is located downstream from the turbine relative to the flow of expanded medium.

5. The environmental control system of claim 4, wherein an outlet of the first drain line is fluidly coupled to a conduit extending between an outlet of the turbine and an inlet of the second water collector.

6. The environmental control system of claim 4, wherein an outlet of the first drain line is fluidly coupled to an inlet of the second water collector.

7. The environmental control system of claim 1, wherein an outlet of the first drain line is directly connected to the second drain line.

8. The environmental control system of claim 1, wherein the second water collector has a main body portion and a settling chamber and an outlet of the first drain line is connected to the settling chamber.

9. The environmental control system of claim 1, wherein the second water collector has a main body portion and a settling chamber and an outlet of the first drain line is connected to the main body portion.

10. The environmental control system of claim 9, wherein the main body portion further comprises a guide operable to substantially separate a flow of water provided via the first drain line from a medium flowing through the second water collector.

11. The environmental control system of claim 1, wherein the at least one spray nozzle is a single spray nozzle.

* * * * *